(12) United States Patent
Nystad (10) Patent No.: US 9,009,208 B2
(45) Date of Patent: Apr. 14, 2015

(54) FLOATING-POINT ADDER (75) Inventor: Jorn Nystad, Trondheim (NO)

(73) Assignee: ARM Limited, Cambridge (GB)

(*) Notice: Subject to any disclaimer, the term of this patent is extended or adjusted under 35 U.S.C. 154(b) by 276 days.

(21) Appl. No.: 13/536,113

(22) Filed: Jun. 28, 2012

(65) Prior Publication Data

US 2013/0007084 A1  Jan. 3, 2013

(30) Foreign Application Priority Data

Jun. 29, 2011 (GB) .................................. 1111035.0
Jul. 5, 2011 (GB) .................................. 1111399.0

(51) Int. Cl.
G06F 7/42 (2006.01)
G06F 7/485 (2006.01)
G06F 7/499 (2006.01)

(52) U.S. Cl.
CPC ............ G06F 7/485 (2013.01); G06F 7/49942 (2013.01)

(58) Field of Classification Search
CPC ..... G06F 7/485; G06F 7/49936; G06F 5/012; G06F 7/49947; G06F 7/572
USPC ........................................................ 708/505
See application file for complete search history.

(56) References Cited

U.S. PATENT DOCUMENTS

| 4,758,972 A * | 7/1988 | Frazier .......................... 708/497 |
| 5,136,536 A | 8/1992 | Ng |
| 5,694,350 A | 12/1997 | Wolrich et al. |
| 5,931,896 A | 8/1999 | Kawaguchi |
| 6,205,460 B1 * | 3/2001 | Steele, Jr. ...................... 708/495 |
| 2001/0051969 A1 | 12/2001 | Obermann et al. |
| 2006/0036667 A1 | 2/2006 | Scrivastava |
| 2006/0206556 A1 | 9/2006 | Lutz et al. |

FOREIGN PATENT DOCUMENTS

WO  WO 98/06031  2/1998

OTHER PUBLICATIONS

Search Report for GB 1111035.0, dated Oct. 7, 2011.
Search Report for GB 1111399.0, dated Oct. 11, 2011.
Search Report for GB 1111399.0, dated Jan. 6, 2012.

* cited by examiner

Primary Examiner — Tan V. Mai
(74) Attorney, Agent, or Firm — Nixon & Vanderhye P.C.

(57) ABSTRACT

Floating point adder circuitry 16, 18, 20 is provided with far-path circuitry 18 and near-path circuitry 20. The far-path circuitry utilises a count of trailing zeros TZ and a difference in the input operand exponents to form respective suffix values which are concatenated with the mantissas of the input addends and serve when summed to generate a carry out taking the place of a conventionally calculated sticky bit. Within the near-path, minimum value circuitry 46 is used to calculate the lower of a leading zeros count of the intermediate mantissa produced in a subtraction and the larger of the input operand exponent values such that a left shift applied to the intermediate mantissa value is not able to produce a invalid floating point result due to applying a left shift to remove leading zeros that is too larger and accordingly corresponds to an exponent which cannot be validly represented.

22 Claims, 9 Drawing Sheets

FLOATING-POINT ADDER

This application claims priority to GB Application No. 1111035.0 filed Jun. 29, 2011 and GB Application No. 1111399.0 filed Jul. 5, 2011, the entire contents of each of which are incorporated herein by reference.

BACKGROUND OF THE INVENTION

1. Field of the Invention

This invention relates to the field of data processing systems. More particularly, this invention relates to the field of floating point adders.

2. Description of the Prior Art

It is known within data processing systems to provide floating point adders which can add and subtract floating point numbers. Such floating point numbers may comprise a sign bit, an exponent field and a mantissa field. An example of the format of floating point numbers and operations of floating point arithmetic may be found within the IEEE 754 Standard.

When adding (or subtracting, which may be achieved by adding with one of the inputs first modified), it is normal that the addend with the smaller exponent will be right shifted to align the decimal point positions prior to the addition being performed. Such an alignment will shift the least significant bits of the mantissa value out of the significance range of the mantissa result and accordingly there will be a loss of precision. This leads to a need to perform appropriate rounding on the result. Various rounding modes are supported in floating point arithmetic. One such rounding mode is round-to-nearest-even. It is known when performing such rounding that a sticky bit should be determined and retained indicating whether any of the bits right shifted out of the significance range when the decimal point positions are aligned has a non-zero value. Such a sticky bit may conventionally be determined by a logical OR operation performed upon all of the bits shifted out of the significance range during the addend mantissa alignment. A problem with this approach is that the OR operation may be many bits wide and introduce a disadvantageous degree of latency in the processing path. Increases in latency can reduce the maximum operating clock frequency that may be used, reduce timing slack and have other negative consequences.

It is known within the field of floating point adders to provide a far-path adder for use when the operands have greater than a predetermined difference in magnitude and a near path adder for use when the operands have less than the predetermined difference in magnitude.

SUMMARY OF THE INVENTION

Viewed from one aspect the present invention provides floating point adder circuitry for adding a first floating point number and a second floating point number, said first floating point number having an exponent value $E_A$ and a mantissa value $M_A$, said second floating point number having an exponent value $E_B$ and a mantissa value $M_B$ and $E_A$ being greater than or equal to $E_B$, said floating point adder circuitry comprising:

far-path circuitry configured to generate a result floating point value when said first floating point number and said second floating point number match at least one predetermined far-path condition, said far-path circuitry having:

trailing zeros counting circuitry configured to determine a trailing zeros value TZ corresponding to a runlength of trailing zero values within a least significant ($E_A$-$E_B$) bits of $M_B$ starting from a least significant end of $M_B$; and a far-path adder configured to add a first addend value and a second addend value, said first addend value including $M_A$ concatenated with a first suffix value and said second addend value including $M_B$ without its ($E_A$-$E_B$) least significant bits and concatenated with a second suffix value; wherein said first suffix value and said second suffix value are formed in dependence upon a respective one of TZ and ($E_A$-$E_B$).

The present technique recognises that instead of explicitly computing a sticky bit by a logical OR of the bits shifted out of the significance range, it is possible to indirectly calculate a bit with the same value by determining the carry out from a sum dependent upon a count of trailing zeros within the shifted out bits and the difference in the exponent values, with one of these addends first being subject to a NOT operation. The calculation of the trailing zeros count can be performed in parallel with the right shift performed upon the smaller addend thereby advantageously reducing latency (delay) through the adder circuit.

The first suffix value may comprise three padding bits followed by one of: (i) the trailing zero count plus two; or (ii) the difference in the exponent values, with one of these being subject to a NOT operation and the second suffix value may comprise one padding bit followed by the other of: (i) the trailing zero count plus two; or (ii) the difference in exponent values.

The three padding bits and the one padding bit may be selected to have values that sum to half of the unit of least precision within the output mantissa value to be generated by the far-path adder in accordance with the format of the floating point sum.

It will be appreciated that the suffix values which are concatenated with the mantissa values to be added and which yield a carry out equivalent to the conventional sticky bit may be formed with either the trailing zero count or the exponent difference value being subject to a NOT operation.

The second addend which is subject to the right shift will also have a prefix of zero values to pad its length back up to the same size as the mantissa of the first addend.

The leading zero values added to the second addend as a prefix may be inserted using second addend shifter circuitry.

The trailing zeros counting circuitry may be configured to operate in a parallel with the exponent difference calculating circuitry. The exponent difference may be required to compare with the trailing zero count, but the trailing zero count operation may be commenced before the exponent difference value is known with this exponent difference value effectively setting a maximum value for the trailing zero count.

The above technique of calculating a bit with the same value as the sticky bit using suffix values concatenated with the mantissas and fed through the far-path adder may be used when the change in length of the values being fed through the far-path adder does not cross a bit width power of two boundary. This constraint arises as a consequence of the way in which many carry-lookahead-adders work (e.g. the Sklansky adder and the Kogge-Stone adder) where there will be an extra gate delay introduced if a power of two boundary is crossed. This constraint is met by many of the real situations in which floating point arithmetic is performed.

It will be appreciated that the floating point addition mechanisms described above require an identification of which input addend has the greater size (at least in terms of having the largest exponent value or the equal largest exponent value or the equal largest exponent value). One way of achieving this is to compare the exponent values before the addition is commenced and then to switch the input addends to the appropriate paths matching the path for the larger addend and the path for the smaller addend. This approach adds relatively little gate count, but increases latency of the operation.

Another approach is to duplicate the adder circuitry and feed the input addends through respective duplicate paths based upon opposite assumptions regarding which of the input addends is the greater in size. The addition operation can thus be commenced sooner and when it is then later determined which of the input operands actually was the greater in size (in the sense of having an exponent value which is larger than or equal to the exponent value of the other input operand), the result from the appropriate duplicate path may be selected for output.

As previously mentioned the adder circuitry of the present techniques may also perform subtraction operations. This may be achieved in some embodiments by the inclusion of inverting circuitry to invert the bits within the mantissa of the second addend prior to addition of the first addend and the second addend. The present techniques apply equally to floating point addition and floating point subtraction.

It will be familiar to those in this technical field that floating point adders may include a far-path adder for adding floating point numbers with a difference in magnitude above a predetermined limit and a near-path adder for adding floating point numbers with a difference in magnitude less than a predetermined limit. The above described technique of determining a bit value equivalent to the sticky bit for controlling rounding has particular use within the far-path adder as a potentially large number of mantissa bits may be shifted out of the significant range and require a sticky bit to be calculated therefrom.

Within the near-path adder it is known to count the leading zeros within the result mantissa and then perform an appropriate shift and exponent adjustment to normalise the floating point result. A problem with this approach is that the leading zero count and associated subsequent left shift to be applied may result in a corresponding exponent value which is outside of the range which can be validly represented. Known techniques for dealing with this problem typically provide additional circuitry for identifying if an out-of-range exponent value is produced and then to fix up the result to generate a denormal floating point number. This approach can introduce a disadvantageous increase in latency within the near-path adder.

Another aspect of the present invention, which may be used on its own or in combination with the above described technique applied to the far-path adder, is one in which minimum value circuitry is provided within the near-path and serves to determine the result shift value by which the result is left shifted as a lower of the leading zero count performed upon the result mantissa and the exponent value of the larger of the input addends (it will be noted that the term addend may still be used even though the problem case is when a subtraction is being performed). If the exponent value of the larger addend is close to the minimum then this may be lower than the leading zero count and accordingly provide the limit of the left shift to be performed upon the result mantissa and control the left shift such that a properly formed denormal number will result without requiring latency increasing fix-up operations to be performed.

The near-path adder may be used when the input addends match a predetermined near-path condition. When the input addends have a small difference in magnitude value, a mantissa shifting circuit may be provided to right shift the mantissa of the smaller addend by the number of bit positions equal to the difference in the exponents prior to the mantissa being input to the near-path adder.

The minimum value circuitry may be configured to generate one or more high order bits of the result shift value before one or more low order bits of the result shift value are generated. This is advantageous as it permits a result shifting circuitry in the form of a logarithmic shifter to commence its right shift of the intermediate mantissa to produce the result mantissa prior to the full precision of the result shift value being available. This reduces the latency of the near-path.

The minimum value circuitry may have a number of different forms and calculate the minimum value in a variety of different ways. One way of the minimum value circuitry operating which has been found convenient in permitting the early generation of the high order bits of the result shift value is when said minimum value circuitry has two inputs LZ and $E_A$ and determines said result shift value by determining a sequence of prefix portions $P_i$ of said result shift value of length $2^i$, starting from i=0, as $P_i$=($LZ_i$ AND NOT $GR_j$) OR ($E_{Ai}$ AND $GR_j$), where ps $LZ_i$ is a prefix portion of LZ of length $2^i$;

$E_{Ai}$ is a prefix portion of $E_A$ of length $2^i$;

for i=0 and each bit position k of descending significance,
  $EQ_i[k]$ is NOT($LZ[k]$ XOR $E_A[k]$);

for i=0 and each bit position k of descending significance,
  $GR_i[k]$=1 when $LZ[k]$>$E_A[k]$ and $GR_i[k]$=0 when $LZ[k]$ ≤$R_A[k]$;

for i>0 and each bit position k of descending significance,
  $EQ_i[k]$=$EQ_{i-1}[k]$ AND $EQ_{i-1}[k+2^{(i-1)}]$; and for i>0 and each bit position k of descending significance,
  $GR_i[k]$=$GR_{i-1}[k]$ OR ($E_{i-1}[k]$ AND $GR_{i-1}[k+2^{(i-1)}]$)

The limiting situation in which the near-path may be used is one where the near-path predetermined amount is one. The technique is particularly useful when the result floating point number is a denormal floating point number.

Viewed from a further aspect the present invention provides floating point adder circuitry for subtracting from a first floating point number a second floating point number, said first floating point number having an exponent value $E_A$ and a mantissa value $M_A$, said second floating point number having an exponent value $E_B$ and a mantissa value $M_B$ and $E_A$ being greater than or equal to $E_B$, said floating point adder circuitry comprising:

near-path circuitry configured to generate a result floating point value when said first floating point number and said second floating point number match at least one predetermined near-path condition, said near-path circuitry having:
  a near-path adder configured to determine an interim mantissa value $M_I$ corresponding to ($M_A$−$M_B$);
  leading zeros counting circuitry configured to determine a leading zeros value LZ corresponding to a runlength of leading zero values within $M_I$ starting from a most significant end of $M_I$;
  minimum value circuitry configured to determine a result shift value as a lower of LZ and $E_A$; and
  result shifting circuitry configured to left shift $M_I$ by a number of bit positions corresponding to said result shift value to generate a result mantissa $M_R$ fanning part of a result floating point number.

It will be appreciated that the technique of reducing latency within the near-path may be used independently of the technique for reducing latency within the far-path. However, the combined use of these techniques is advantageous in that the near-path and the far-path may be maintained in balance with respect to their latency.

Another aspect of the invention provides floating point arithmetic circuitry for determining a sticky bit for use when adding a first floating point number and a second floating point number, said first floating point number having an exponent value of $E_A$ and a mantissa value of $M_A$, said second floating point number having an exponent value of $E_B$ and a mantissa value of $M_B$, and $E_A$ being greater than $E_B$, said floating point arithmetic circuitry comprising:

shift amount determining circuitry configured to determine a shift amount in dependence upon $(E_A-E_B)$, said shift amount corresponding to a right shift to be applied to $M_B$ to form a shifted version of $M_B$ to be added to $M_A$;

trailing zero counting circuitry configured to determine a trailing zeros value corresponding to a runlength of trailing zero values of $M_B$ starting from a least significant bit end of $M_B$; and sticky bit value determining circuitry configured to compare said shift amount with said trailing zeros value to determine a value of said sticky bit indicating if any nonzero bit will be shifted out from said shifted version of $M_B$ to be added to $M_A$.

Further aspects of the invention are set out in the accompanying claims.

The above, and other objects, features and advantages of this invention will be apparent from the following detailed description of illustrative embodiments which is to be read in connection with the accompanying drawings.

DESCRIPTION OF THE EMBODIMENTS

Figure 1:
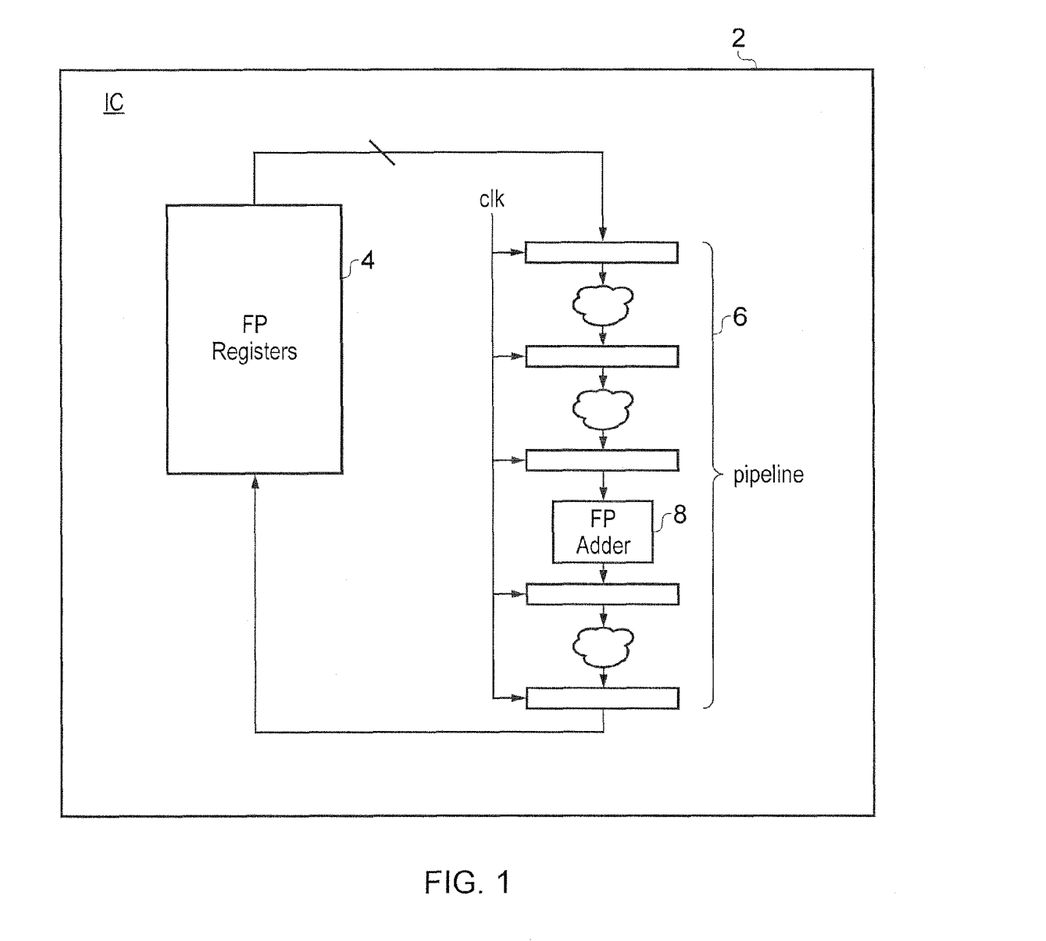
FIG. 1 schematically illustrates an integrated circuit including floating point adder circuitry.

FIG. 1 schematically illustrates an integrated circuit 2 including a bank of floating point registers 4 for storing floating point numbers and a data processing pipeline 6 including a plurality of processing stages with at least one of the processing stages providing floating point adder circuitry 8. In accordance with conventional pipelining within data processing systems, the pipeline stages are driven by a common clock signal which controls the advancement of the result(s) of one processing stage to the next processing stage. Measures which can reduce the latency associated with the processing being performed at each processing stage are advantageous as they, for example, may permit a higher clock frequency to be used and accordingly achieve a higher amount of data processing within a given amount of time. Reduced latency may also increase the timing slack between processing stages which has the advantage of making the design more robust.

Figure 2:
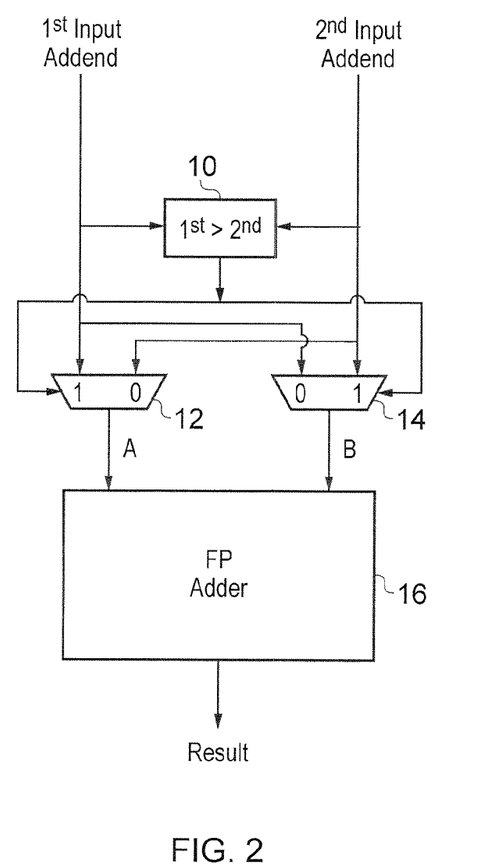
FIGS. 2 and 3 schematically illustrate two approaches for ensuring that a floating point addition result is generated based upon inputs for which it is known which of the inputs is the greater in magnitude.
Figure 3:
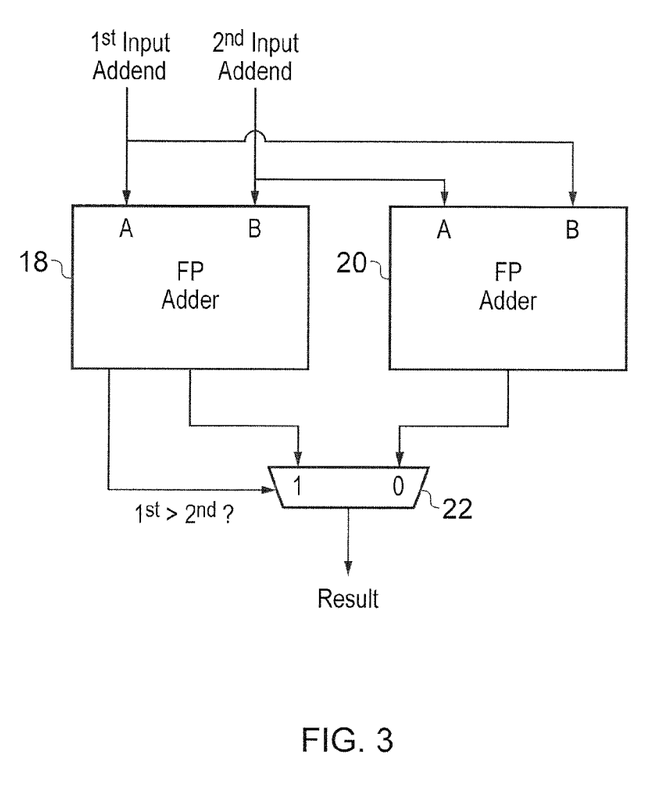

In floating point adder circuitry in accordance with the example embodiments described herein there is an assumption that the floating point number with the highest magnitude is supplied as input addend A and the floating point number with the lower magnitude is supplied as input addend B. When two arbitrary floating point numbers are received as inputs to the floating point adder circuitry 8, it may not be known in advance which has the greater magnitude. FIG. 2 and FIG. 3 illustrate two alternative approaches to dealing with this issue.

In FIG. 2 comparison circuitry 10 serves to compare the magnitude (or at least the magnitude of the exponents) of the two input addends. The result of this comparison is then used to control multiplexers 12, 14 to direct the first input addend and the second input addend so as to form the appropriate respective ones of the inputs A and B to the floating point adder circuitry 16. This approach has the advantage of adding relatively little additional gate count, but suffers from the disadvantage that there is an increase in the latency associated with the floating point addition due to the need to resolve the result from the comparison circuit 10 before the floating point adder circuitry 16 can start to operate.

FIG. 3 illustrates an alternative approach. In this approach the floating point adder circuitry 18, 20 is duplicated and each receives the two input addends. In the floating point adder circuitry 18 there is an assumption that the first input addend is greater in magnitude than the second input addend. In the second floating point adder circuitry 20 there is an assumption that the second input addend is greater in magnitude than the first input addend. Both the floating point adder circuitry 18 and the floating point adder circuitry 20 operate in parallel to compute respective result floating point numbers. One of these floating point numbers will be incorrect, as it will be based upon an incorrect assumption as to which of the first input addend and the second input addend is greater in magnitude. Part of the way through the calculations performed by the floating point adder circuitry 8 and the floating point adder circuitry 20, a determination may be made as to which of the first input addend and the second input addend is greater. This determination is supplied to a multiplexer 22 to select the result floating point number from the floating point adder circuitry 18, 20 which was using the correct assumption. This approach has the advantage of producing less of an increase in latency associated with the floating point addition, but has the disadvantage of a higher gate count since the floating point adder circuitry 18, 20 is duplicated so as to provide duplicate circuitry configured to form a first processing path based upon a first assumption and a second processing path based upon a second assumption.

Figure 4:
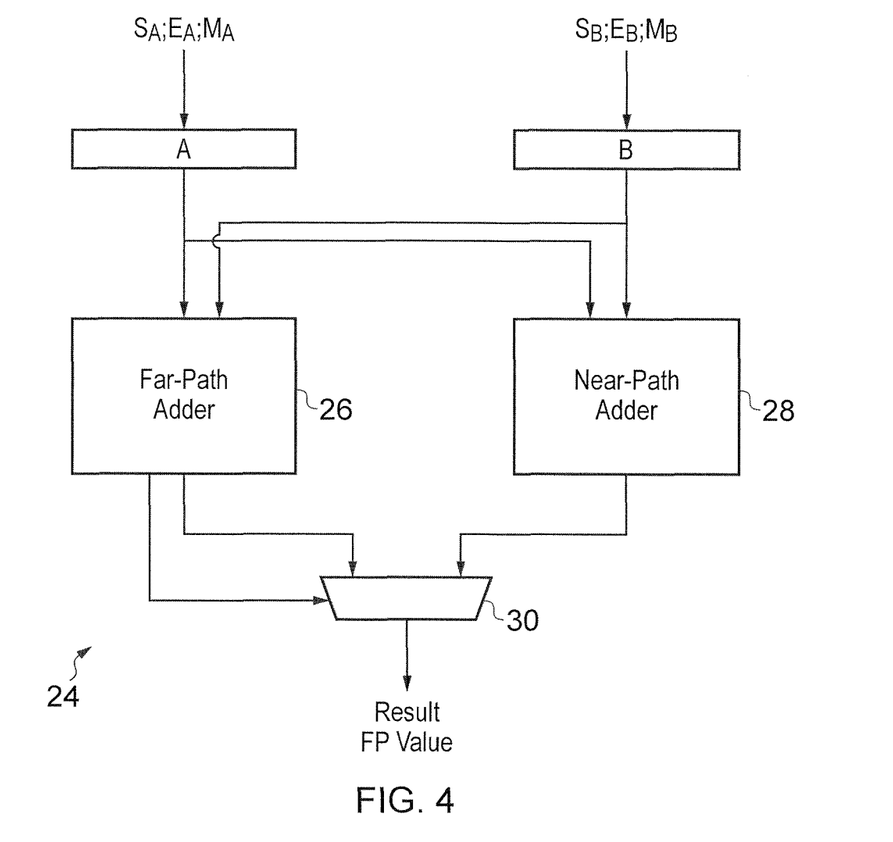
FIG. 4 schematically illustrates floating point adder circuitry including a far-path adder and a near-path adder.

FIG. 4 schematically illustrates floating point adder circuitry 24 used to add (or subtract) two floating point numbers. Each of these floating point numbers comprises a sign bit S, and exponent bit field E and a mantissa bit field M. As will be familiar to those in this technical field, there are provided within the floating point adder circuitry 20 far-path circuitry 26 for use when adding (or subtracting) two floating point numbers dissimilar in magnitude as well as near-path circuitry 28 for use when adding (or subtracting) two floating point numbers that are similar in magnitude. A multiplexer 30 is controlled by a determination of the size of the difference in magnitude between the two input addends to select as a result floating point value either the output from the far-path circuitry 26 or the output from the near-path circuitry 28. The far-path condition and the near-path condition which determine which one of the far-path circuitry 26 and the near-path circuitry 28 is to be used may be evaluated in the following manner 1: If the two inputs have the same sign, then this is an "effective-add", which uses the far-path 2: If Ea−Eb is greater than one, then the far-path is used.

3: If Ea−Eb is zero and the two inputs have opposite signs, then the near-path is used.

4: If Ea−Eb is one and the inputs have the opposite sign, then the mantissa bits are examined: If the next-to-highest bit of Ma (that is, the highest bit after the leading 1-bit) is one, then the far-path is used, else the near-path is used.

Figure 5:
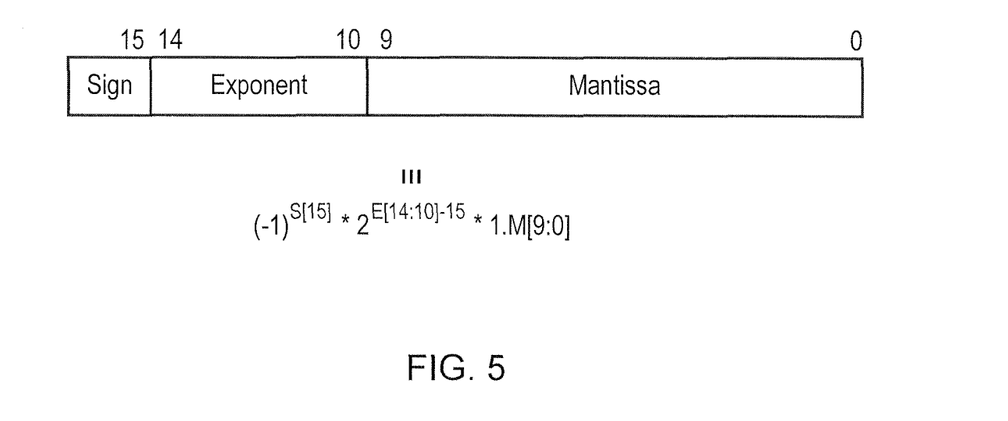
FIG. 5 schematically illustrates the format of a 16-bit floating point number.

FIG. 5 schematically illustrates the format of a 16-bit floating point numbering in accordance with the IEEE-754-2008 Standard. In particular, such floating point numbers include a single sign bit, a 5-bit exponent field and a 10-bit mantissa field. The relationship between the bit values within these fields and the floating point number being represented in shown in FIG. 5. It will be seen that the exponent value is subject to an offset of "−15". This has the result that when the exponent field [14:10] has its lowest normal value of one, then the floating point number being represented includes a factor of $2^{-14}$. If it is desired to represent a smaller floating point number, then it is not possible to reduce the exponent value further and accordingly a denormal number is used. With a denormal number, the exponent value field is all zeros, but the mantissa field is not associated with an assumed leading value of "1" to the left of the decimal point position. Thus, there are leading zeros within the mantissa value such as "0.000 . . . ". Such denormal values will be familiar to those in this technical field.

Figure 6:
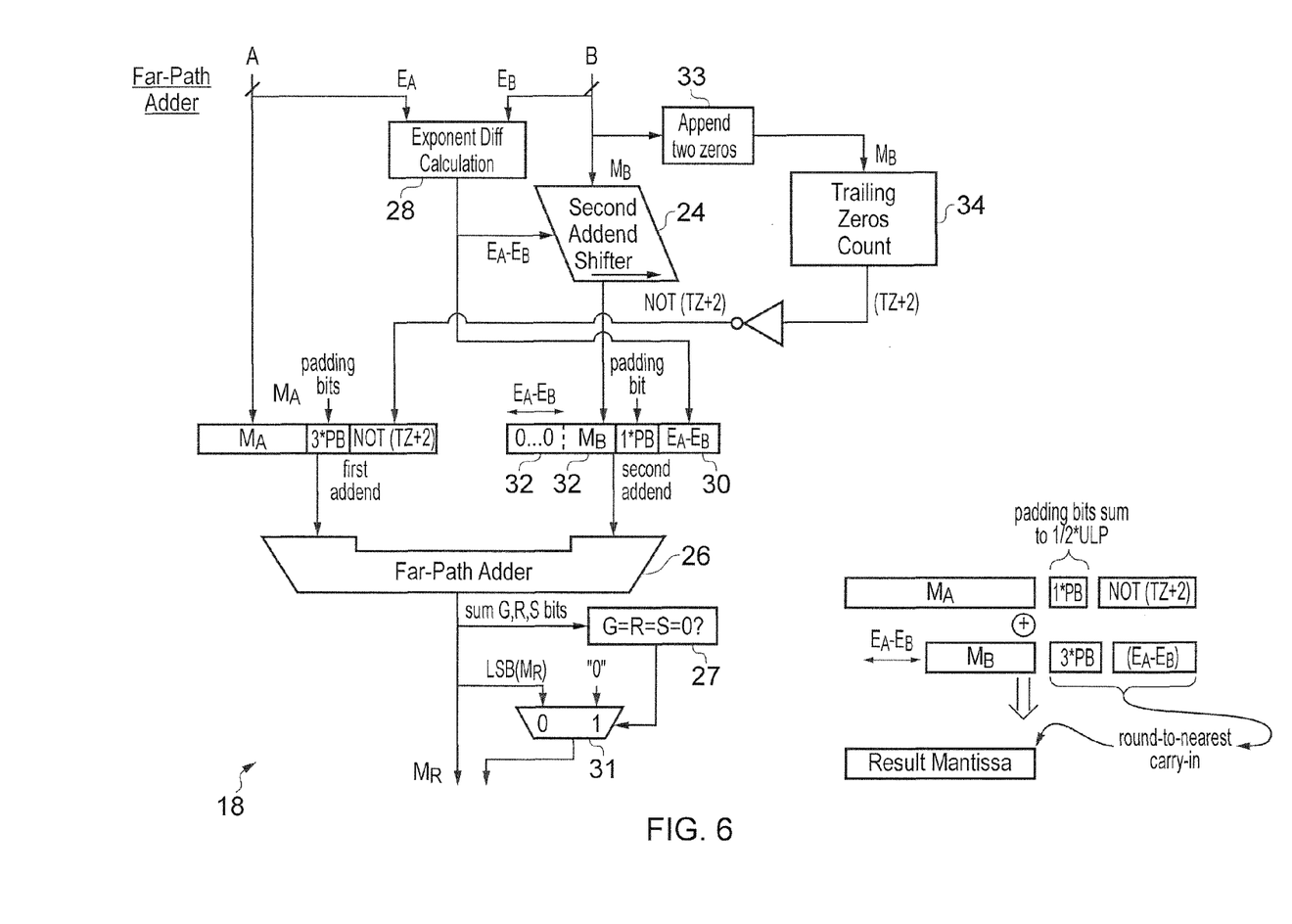
FIG. 6 schematically illustrates a far-path adder including trailing zeros counting circuitry.

FIG. 6 schematically illustrates far-path circuitry 18. The input addend having the greatest magnitude (or at least the exponent which is greatest) is supplied on input A. The other input floating point number is supplied on input B. It will be appreciated that if the exponent values are the same, then it will not matter in which order the input addends are applied to inputs A and B. The general principle of operation of the far-path circuitry 18 is that the smaller magnitude input addend is right shifted by second addend shifter circuitry 24 so as to equalise the effective exponent values between the two addends and align the decimal point positions within the mantissa before a far-path adder 26 adds the two mantissa values.

In conventional far-path circuitry the bits of the smaller input addend which are right shifted out of the significance range which will be added by the far-path adder 26 need to be examined to determine whether they will result in a carry-in into the result mantissa value that can affect the rounding which is then applied to the mantissa value. The conventional way of determining such a carry-in value (or sticky bit) is to perform a logical OR of all of the low order bits of the low magnitude input addend which are right shifted out of range of the far-path adder 26. A problem with the use of such a logical OR approach is that it introduces a disadvantageous degree of additional latency. The circuit of FIG. 6 takes a different approach.

Exponent difference calculating circuitry 28 determines a difference between the two exponent values of the respective input addends A, B. This is supplied as an input to the second addend shifter circuitry 24 to control the amount of right shifting applied to the mantissa of the smaller input addend as described above. The difference in the exponent values ($E_A$−$E_B$) is also supplied as a suffix value 30 which is concatenated with the right shifted mantissa 32 of the smaller of the input addends. One padding bit PB is inserted between the shifted mantissa 32 and the exponent difference ($E_A$−$E_B$). The second addend shifter circuitry 24 fills the most significant ($E_A$−$E_B$) bits of the input to the far-path adder 26 on the B path with zero values 32. Thus, the second addend supplied on the B path to the far-path adder 26 is formed of the input mantissa B without its ($E_A$−$E_B$) least significant bit concatenated with a one padding bit and a suffix value which represents the difference in the exponents calculated by the exponent difference calculation circuitry 28 as well as with a prefix value of zeros as inserted by the second addend shifter circuitry 24.

In parallel with the operation of the second addend shifter circuitry 24, appending circuitry 33 appends two zeros to the mantissa $M_B$ of the B path. Trailing zeros counting circuitry 34 receives the input mantissa value with the two appended zero bits from the B path and counts the number of trailing zeros (i.e. counts the number of contiguous zeros present starting form the arithmetic least significant end of the mantissa value with the two appended zeros). This trailing zeros value (TZ+2) is then subject to a NOT operation before being concatenated with three padding bits and the mantissa value $M_A$ supplied down the A path to form a suffix to the mantissa $M_A$ of the A path. The mantissa from the A path $M_A$ with a suffix of three padding bits followed by NOT (TZ) serves as the first addend to the far-path adder 26. The far-path adder 26 adds the first addend and the second addend including their suffix values to produce a result mantissa value $M_r$.

The result of the addition to the two suffix fields namely ($E_A$−$E_B$) and NOT (TZ) produces a carry out which is the same as if the sticky bit had been calculated in accordance with the previous techniques. Thus, this carry out produced from the addition of the suffix values may be fed up the carry chain toward the lowest bit position of the result mantissa and serves to achieve the necessary rounding when performing round-to-nearest.

The padding bits have values such that when they are summed they produce a result corresponding to half the unit of least precision of the output mantissa value. Alternatively, such a half ULP value could be separately added to the mantissa sum.

In order to deal with round-to-even requirements, if the guard, rounding and sticky bits are all zero, then the least significant bit of the mantissa result is set to zero with the action of the comparator 27 and the multiplexer 31.

It will be appreciated that the two suffix values may be applied either way round to the paths A and B, namely the NOT (TZ) could be the suffix in the path B and the ($E_A$−$E_B$) could be the suffix on path A. Also the suffix value could be T2 and NOT ($E_A$−$E_B$). All of these possibilities are encompassed in the present techniques.

These techniques operate when the increase in the length of the values being added by the far-path adder 26 does not cross a power of two boundary. This is equivalent to the condition that the bit length of $M_A$ is greater than or equal to $2^X$, where X is a positive integer and a bit length of the first addend is less than $2^{(X+1)}$.

It will be appreciated that the far-path adder circuitry 18 will typically include many further processing elements. These processing elements may, for example, deal with the handling of sign bits, the generation of the result exponent value, the inverting of one of the mantissa values in order to perform a subtraction and other processing requirements which will be familiar to those in this technical field. Circuits including such additional elements are encompassed within the present techniques.

Considering a simplified example by way of illustration:
Ma=1.01010, Ea=5
Mb=1.10100, Eb=2
Mb has two trailing zeroes, however with the padding it gets 4.
Now, performing right-shift and addition:

> 1.01010_00_0_011 // Ma plus three zeros of padding,
>
> then the shift-amount
>
> +0.00110_10_0_011 //
>
> Mb right-shifted by 3 retaining the 2 lsb's of the shifted mantissa, followed by one bit of padding followed by NOT(TZ + 2)
>
> +0.00000_10_0_00 // half an ULP
> ________________
> +1.10001_00_0_110 // interim result GRS GRS are all zeroes, so the LSB of the mantissa result must be cleared:
+1.10001 AND NOT LSB=1.10000 which is the correct result.

Figure 7:
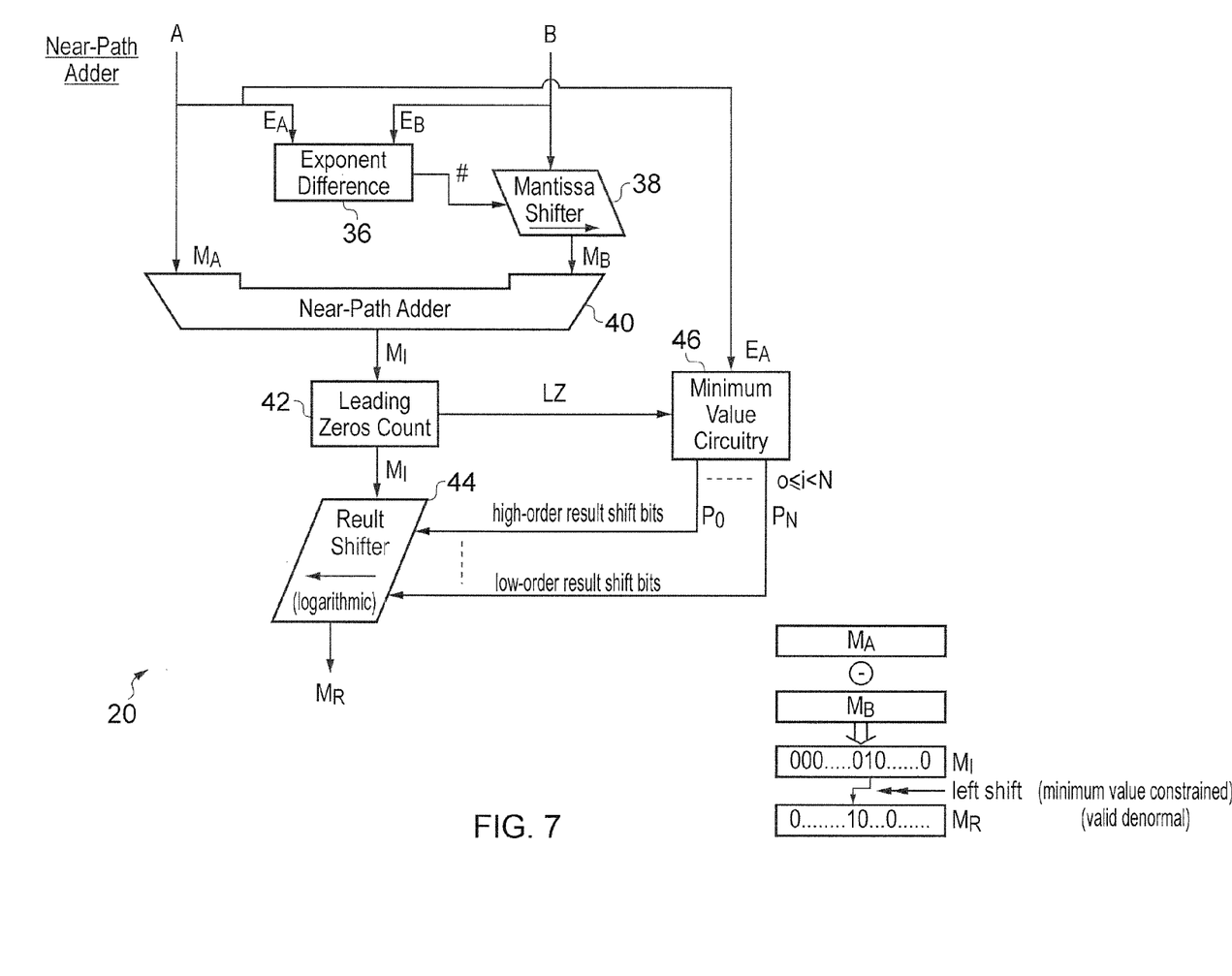
FIG. 7 schematically illustrates near-path adder circuitry including minimum value circuitry.

FIG. 7 schematically illustrates near-path circuitry 20. This near-path circuitry 20 is used when the input addends have the same exponent value or an exponent value differing by at most one. If the exponent values differ, then this is detecting by exponent difference circuitry 36 which accordingly controls mantissa shifting circuitry 38 to right shift the input addend of the B path by one bit position so as to equalise the effective exponents and align the decimal points positions within the mantissas. The mantissa $M_A$ from the A path and the mantissa $M_B$ (possibly right shifted by the mantissa shifting circuitry 38) are supplied as input addends to a near-path adder 40. The near-path adder 40 generates an interim mantissa value $M_I$.

It will be appreciated that when the magnitude of the two input addends is similar and a subtraction is performed, the magnitude of the result floating point number may be significantly smaller than both of the input floating point numbers. If the input floating point numbers themselves are close to the minimum that may be supported with the floating point number format used, then there is a likelihood of denormal result floating point numbers being generated.

Leading zeros counting circuitry 42 serves to count the number of leading zeros (the number of contiguous zero values starting from the arithmetically most significant end of the mantissa) within the intermediate mantissa value such that the intermediate mantissa value may be left shifted to produce a normal floating point number if possible. However, if the exponent values of the inputs to such a subtraction are small, or the inputs happen to be very similar such that the difference is small, then it may be that left shifting by the full amount of the leading zeros value LZ counted by the leading zeros counting circuitry 42 would result in an invalid exponent value which is too small to be properly represented in the floating point number format concerned.

In particular, if the smallest permitted value of the exponent value field is zero and if the left shift indicated by the leading zeros count value LZ indicates that the exponent field value should be negative (NB there is an offset of −15 applied in the format), then this cannot be properly represented. It would be possible to try to trap such result values after they have been generated, but such mechanisms would typically increase latency by requiring an examination of the result after it had been generated, i.e. after the left shift had been applied by result shifting circuitry 44 which receives the intermediate mantissa value. The result shifting circuitry 44 is a logarithmic shifter which may be used to apply large shift displacements first with smaller shift displacements being applied later.

The near-path circuitry 20 of the present technique includes minimum value circuitry 46 which receives as inputs the exponent value $E_A$ of the larger of the input operands as well as the leading zeros value LZ. The minimum value circuitry produces a result shift value specifying the number of left shifts to be produced by the result shifting circuitry 44. This result shift value is determined based upon the inputs LZ and $E_A$. Shown in FIG. 7 is the arithmetic and logical manipulation performed using these two inputs LZ and $E_A$ which generates the result shift value. In particular if the minimum value circuitry 46 has two inputs LZ and $E_A$ it is configured to determine a result shift value by determining a sequence of prefix portions $P_i$ of said result shift value of length $2^i$, starting from i=0, as $P_i$=($LZ_i$ AND NOT $GR_i$) OR ($E_{Ai}$ AND $GR_i$), where
$LZ_i$ is a prefix portion of LZ of length $2^i$;
$E_{Ai}$ is a prefix portion of $E_A$ of length $2^i$;
for i=0 and each bit position k of descending significance, $EQ_i$[k] is NOT($LZ$[k] XOR $E_A$[k]);
for i=0 and each bit position k of descending significance, $GR_i$[k]=1 when LZ[k]>$E_A$[k] and $GR_i$[k]=0 when LZ[k] ≤$E_A$[k];
for i>0 and each bit position k of descending significance, $EQ_i$[k]=$EQ_{i-1}$[k] AND $EQ_{i-1}$[k+$2^{(i-1)}$]; and
for i>0 and each bit position k of descending significance, $GR_i$[k]=$GR_{i-1}$[k] OR ($E_{i-1}$[k] AND $GR_{i-1}$[k+$2^{(i-1)}$])

This evaluation of the result shift value is such that the higher order bits of the result shift value are available before the low order bits of the result shift value. These high order bits of the result shift value can accordingly be supplied to the result shifting circuitry 44 to control its high order shifts before the low-order result shift value bits are available. This allows the evaluation of the minimum value circuitry 46 to be performed at least partially in parallel with the action of the result shifting circuitry 44. This reduces the latency through the near-path circuitry 20.

The minimum-value circuit that delivers the highest bits first.

It works as follows:
For each bit position in the two input values LZ and $E_A$, we determine two bits 'EQ' and 'GR'; 'EQ' corresponds to the case where the bit from LZ is equal to the bit from input $E_A$; the bit 'GR' corresponds to the case where the bit from. LZ is greater than the bit from input $E_A$.
Based on 'EQ' and 'GR' bits for each bit position EQ[k] and GR[k], we can then compute 'EQ' and 'GR' bits for any 2-bit sequence, by combining 'EQ' and 'GR' bits as follows:
EQ_combined=EQ_high AND EQ_low
GR_combined=GR_high OR (EQ_high AND GR_low)
From the 'EQ' and 'GR' bits for any 2-bit sequence, we can then combine the 'EQ' and 'GR' bits from adjacent 2-bit sequences in order to compute 'EQ' and 'GR' bits for every 4-bit sequence.
This combination procedure is then repeated with adjacent 4-bit sequences to form 'EQ' and 'GR' for every 8-bit sequence, adjacent 8-bit sequences to form 'EQ' and 'GR' to form 'EQ' and 'GR' for 16-bit and so on.
At the end, a 'GR' value has been determined for each bit-position; this bit can be used to select the minimum value of LZ and $E_A$:min(LZ, $E_A$)=(LZ AND NOT GR) OR ($E_A$ AND GR)

This does not by itself give us the highest bits first. However, for the minimum value function, if we define a function prefix( ) that just returns a certain number of high-order-bits of its input, then the relation prefix(min(a,b))=min(prefix(a), prefix(b));

(for example, if the prefix function returns the top 4 bits, a=01011100 and b=10101111, then min(a,b)=01011100, prefix(a)=0101, prefix(b)=1010, prefix(min(a,b)=0101 and min(prefix(a),prefix(b))=0101, and the relation holds).

This relation holds now matter how many or few bits the prefix( ) function returns.

This relation can be used with the 'EQ' and 'GR' bits as follows:

Since the top bits of LZ and $E_A$ are 1-bit prefixes of LZ and $E_A$, we can use the 'GR'-bits for the top bit to correctly determine the top bit of the minimum value result.

Similarly, for the top 2 bits, we can use the 'GR'-bits for the top 2-bit sequence to correctly determine the top 2 bits of the minimum value result.

And so on; for the top 4 bits, we can use the 'GR' bit for the top 4-bit sequence to correctly determine the top 4 bits of the minimum value result.

And so on for 8, 16, 32 etc bits

This way, the correct minimum-value bits may be obtained in a highest-bit-first fashion.

An example follows with the bit-strings LZ=01010111 and $E_A$=01010101, trying to compute the value X=min(LZ, $E_A$):

First, compute 'EQ' and 'GR' bits for each bit-position; this gives us EQ=11111101 and GR=00000010

At this point, 'GR' for the top bit is '0', so the top bit of X is computed as (LZ AND NOT GR) OR ($E_A$ AND GR), resulting in '0'.

Next, we combine the 'EQ' and 'GR' bits for adjacent bit-positions; this gives us EQ=1111100 and GR=0000011

At this point, we have that 'GR' for the top 2-bit-sequence is '0', so the top two bits can be computed as (LZ AND NOT GR) OR ($E_A$ AND GR), resulting in "01". (Of course, computing the top bit as this point is redundant, since this was already done earlier.)

Next, combine the 'EQ' and 'GR' bits for adjacent 2-bit positions; this gives us EQ=11100 and GR=00011.

At this point, we have that 'GR' for the top 4-bit-sequence is '0', so the top four bits can be computed as (LZ AND NOT GR) OR ($E_A$ AND GR), resulting in "0101". (Computing the top two bits as this point is redundant, since this was already done earlier.)

Next, we combine the 'EQ' and 'GR' bits for adjacent 4-bit positions, giving us the final 'EQ' and 'GR' values for the number as a whole: 'EQ'=0, 'GR'=1.

At this point, we have that 'GR' for the full 8-bit-number is '1', so the top four bits can be computed as (LZ AND NOT GR) OR ($E_A$ AND GR), resulting in "01010101". (Computing the top four bits as this point is redundant, since this was already done earlier.)

Notice how the results for the 1-bit, 2-bit and 4-bit prefixes are obtained earlier than the result for the full 8-bit number.

As previously discussed, the near-path is used to handle cases where cancellation happen (floating-point addition of A and B, where A is very close to −B); in this case, we need to perform a left-shift to normalize the mantissa of the resulting floating-point number. However, cancellation can result in a floating-point number so small that it becomes denormal; in this case, we must limit the left-shift being performed.

The normalization is done by performing a count-leading-zeroes (CLZ) on the mantissa after subtraction. For our purposes, we prepend a single '0'-bit before the CLZ, then perform the CLZ operation, then perform a minimum-value operation between the CLZ result and the exponent of the larger input number, then use the result of the minimum-value operation as a shift-amount to apply to the result number.

Consider an FP 16 example where the result is NOT a denormal first.

Let A=0_00111_1100001010 and $B$=1_00111_1000000000

Breaking these two numbers into exponent and mantissa (implicit 1-bit), we get: A_exp=00111, A_mant=11100001010, B_exp=00111, B_mant=1100000000 The larger exponent is MaxExp=max(A_exp, B_exp)=00111

Then prepend and append a zero to the mantissas before subtraction:

A_mant:=0_11100001010_0

B_mant:=0_11000000000_0

Then perform the actual subtraction:

Diff=$A$_mant−$B$_mant=0001000010100

Performing count-leading-zeroes on this result, yields Cdiff=CLZ(Diff)=3.

Then compute the minimum value: Lsh=Min(Cdiff, MaxExp)=3. Then perform a left-shift of 'Lsh' bits to get the result mantissa value Res_mant=Diff<<Lsh=1000010100000 Since the result is normal, then compute the exponent as: Res_exp=MaxExp+1−Cdiff=00100. Then also take mantissa result, throwing away the lowest two bits.

Then assemble the final result: Res=0_00100_0000101000 (note that since the MSB of the mantissa is implicit, it does not actually appear in the result.)

Then, consider a second FP 16 example, where the result is a denormal.

Let A=0_00010_1100001010 and B=1_00010_1100000000

Breaking these two numbers into exponent and mantissa (implicit 1-bit), yields:

A_exp=00010, A_mant=11100001010, B_exp=00010, B_mant=11100000000 The larger exponent is MaxExp=max (A_exp, B _exp)=00010

Then prepend and append a zero to the mantissas before subtraction:

A_mant:=0_11100001010_0

B_mant:=0_11100000000_0

Then perform the actual subtraction:

Diff=$A$_mant−$B$_mant=0000000010100

Performing count-leading-zeroes on this result, yields Cdiff=CLZ(Diff)=8.

Then compute the minimum value: Lsh=Min(Cdiff, MaxExp)=2. Then perform a left-shift of 'Lsh' bits to get our result mantissa value Res_mant=Diff<<Lsh=0000001010000. Since the result is denormal, the exponent is zero. Also take the mantissa result, throwing away the two lowest bits. Then assemble the final result: Res=0_00000_0000010100 (again, the MSB of the mantissa does not appear in the final result; for this denormal-case, this MSB is zero).

Both examples cover two inputs of the same order of magnitude; in the case of two inputs of differing magnitude, the magnitudes may differ by at most 1 (or else the system would have used the far-path); in this case, the mantissa of the smaller number would have two zero-bits prepended and no zero-bits appended before the subtraction, while the mantissa of the larger number would have one zero-bit prepended and one zero-bit appended.

Note that in case of both normal and denormal results, the least significant two bits of the result mantissa after addition are thrown away. For the case of subtracting two numbers of equal magnitude, these two bits are guaranteed to be 0, since the shift amount is always at least 1. For the case of subtracting two numbers of differing magnitude, it is possible to get a shift-amount of 1 and thus nonzero data in these bits; in this case, the near-path produces an incorrect result, and the overall adder result to return must be taken from the far-path.

FIG. 7 illustrates in its lower right hand corner portion how two inputs may be subtracted to produce an intermediate mantissa value that is left shifted in accordance with its full leading zero account would produce an invalid number since the corresponding exponent would be smaller than can be validly represented in the format concerned. In this case the minimum value circuitry 46 serves to constrain the left shift applied to be the lower of the leading zero value LZ and the exponent $E_A$ of the larger input. The result shift value determined by the minimum value circuitry 46 is determined in parallel with the operation of the result shifting circuitry 44 enabling reduced latency within the near-path circuitry 20.

Figure 8:
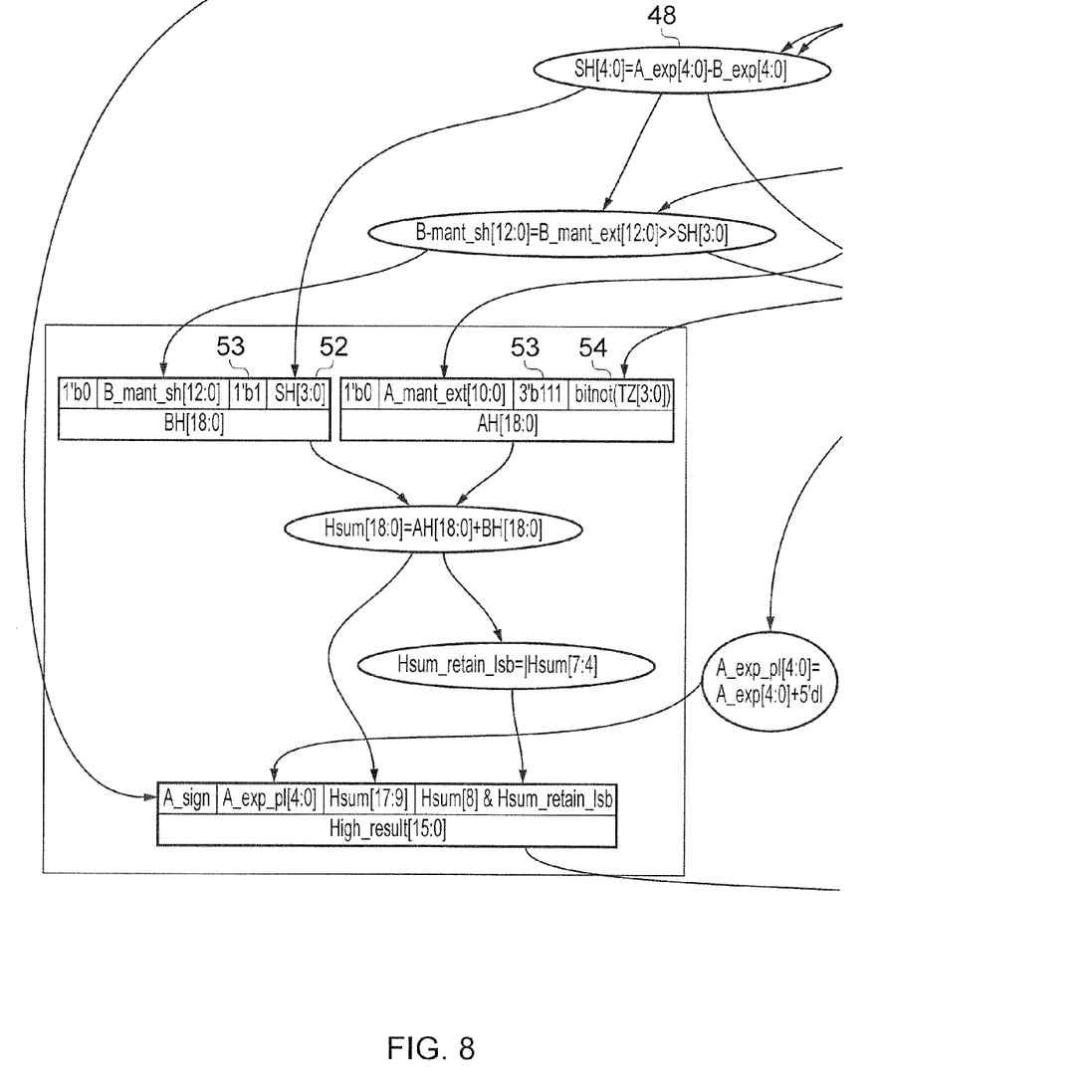
FIG. 8 schematically illustrates data flow within a 16-bit floating point addition using a trailing zeros count to determine the equivalent of a sticky bit.

FIG. 8 is a diagram schematically illustrating the relationship between the fields within two 16-bit floating point numbers and values calculated (or assembled) within the far-path adder during floating point addition. In particular, within FIG. 8 the difference in the exponent values is used to form a 5-bit shift value SH at stage 48. A trailing zeros value (TZ+2) is calculated from an extended version (by appending two zero bits) of the input mantissa of least magnitude at stage 50. In both the high assumed result path and the low assumed result path, there are formed mantissa values with suffixes respectively comprising the difference in exponent values 52 and a NOT of the trailing zero count value 54. Additional padding bits 53 with fixed values are inserted within the mantissas to be added as is illustrated in FIG. 8. These serve to add a value equal to half the unit of least precision (ULP) of the mantissa result into the sum. The effect of adding the two suffix values 52, 54 is that a carry out therefrom is generated which represents a sticky bit which would have been generated by a multibit OR operation if it had been performed upon the bits of the mantissa $M_B$ which are right shifted out of the significance range during exponent equalisation and decimal point alignment operations. This carry out value (sticky bit replacement) serves to ripple up through the mantissa addition as required in order to apply the appropriate rounding for a nearest value rounding mode as will be familiar to those in this technical field.

Figure 9:
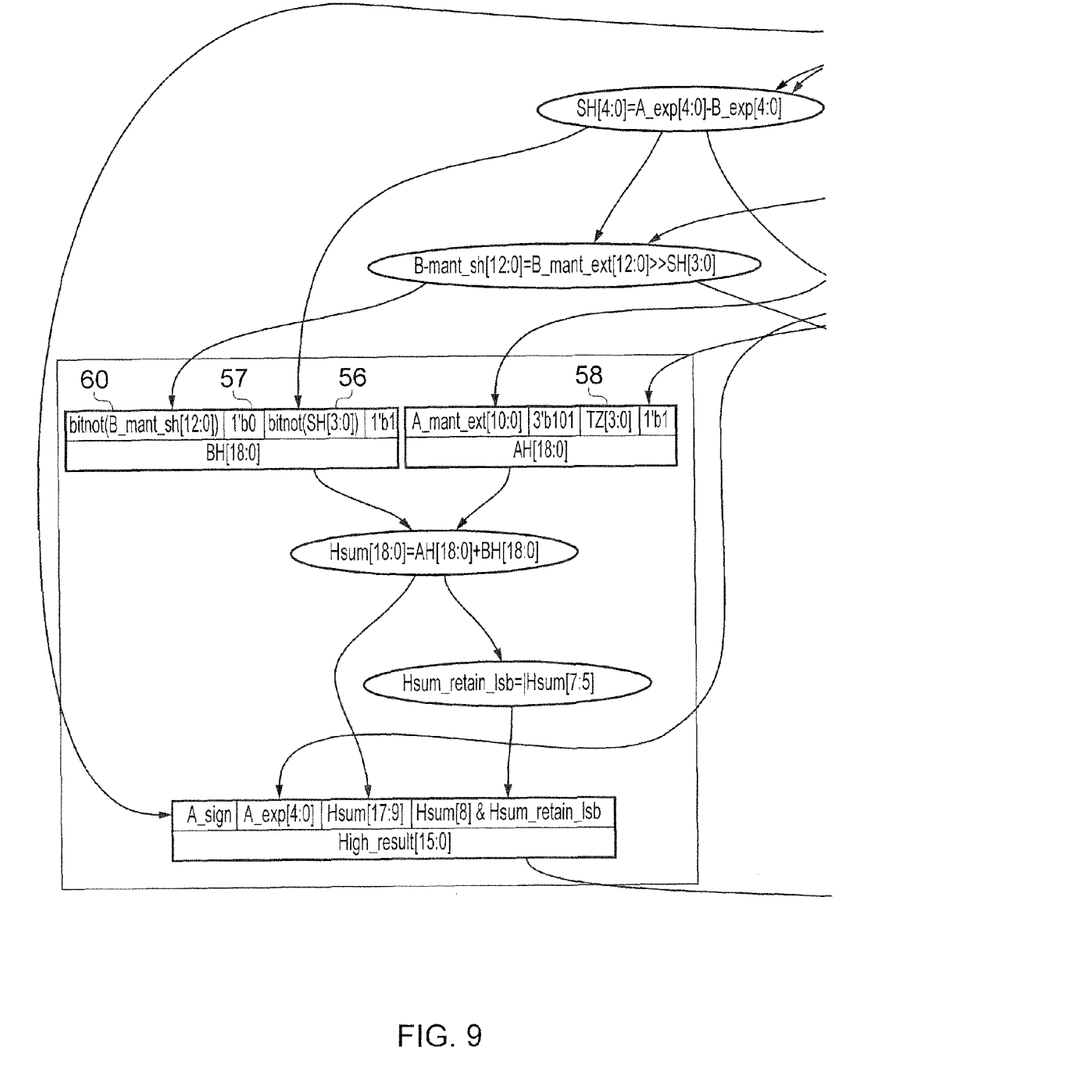
FIG. 9 schematically illustrates the data flow within a 16-bit floating point subtraction using a trailing zeros count to determine the equivalent of a sticky bit.

FIG. 9 is similar to FIG. 8 except that it corresponds to subtraction. In this case it is the NOT of the difference between the exponents ($E_A$-$E_B$) which is used as one suffix 56 with the other suffix being provided by the trailing zero value 58. The padding bits 57 have different values to achieve the ½ ULP addition. Furthermore, the mantissa of the lower magnitude input on the B path is subject to a NOT operation before being supplied to the far-path adder 26 as shown by field 60 in order that the action of the far-path adder 26 will be a subtraction rather than an addition.

The sticky bit may be calculated as discussed in relation to FIG. 6 in its own floating point arithmetic circuit separate from any main adder that is present. The sticky bit indicates that some non-zero bit is shifted out of the main sum computation when this is performed. The shift amount is computed from exponent difference $E_a$-$E_b$, (the shift amount is not always exactly equal to the difference, but is calculated using this difference). If the number of trailing zeros in the B addend is counted, then comparing the shift amount and the trailing zeros count indicates whether any non-zero bit will be shifted out when the main sum computation is performed (i.e. it can be determined whether the sticky bit should be set). This can be determined before the B addend is shifted.

In some embodiments the trailing zero count may be performed (or at least started on both operands before it is determined which is the larger. Similarly two shift amounts, $E_a$-$E_b$ and $E_b$-$E_a$, may be calculated (or at least started) before it is determined which operand is the larger. This sticky bit determining circuitry may be used in combination with the other features described above.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Floating point adder circuitry for adding a first floating point number and a second floating point number, said first floating point number having an exponent value $E_A$ and a mantissa value $M_A$, said second floating point number having an exponent value $E_B$ and a mantissa value $M_B$ and $E_A$ being greater than or equal to $E_B$, said floating point adder circuitry comprising:
far-path circuitry configured to generate a result floating point value when said first floating point number and said second floating point number match at least one predetermined far-path condition, said far-path circuitry having:
trailing zeros counting circuitry configured to determine a trailing zeros value TZ corresponding to a runlength of trailing zero values within a least significant ($E_A$-$E_B$) bits of $M_B$ starting from a least significant end of $M_B$; and
a far-path adder configured to add a first addend value and a second addend value, said first addend value including $M_A$ concatenated with a first suffix value and said second addend value including $M_B$ without its ($E_A$-$E_B$) least significant bits and concatenated with a second suffix value; wherein
said first suffix value and said second suffix value are formed in dependence upon a respective one of TZ and ($E_A$-$E_B$).

2. Floating point adder circuitry as claimed in claim 1, wherein said first suffix value and said second suffix value are formed in dependence upon a respective one: of TZ; and NOT(($E_A$-$E_B$)).

3. Floating point adder circuitry as claimed in claim 2, wherein said first suffix value comprises three padding bits followed by a first suffix terminating value and said second suffix value comprises one padding bit followed by a second suffix terminating value, said first suffix terminating value and said second suffix terminating value comprising respective ones of: (TZ+2); and NOT (($E_A$-$E_B$)).

4. Floating point adder circuitry as claimed in claim 3 wherein said three padding bits and said one padding bit sum to a value corresponding to half of a unit of least precision in an output of said far-path adder.

5. Floating point adder circuitry as claimed in claim 1, wherein said first suffix value and said second suffix value are formed in dependence upon a respective one of NOT(TZ) and ($E_A$-$E_B$).

6. Floating point adder circuitry as claimed in claim 5, wherein said first suffix value comprises three padding bits followed by a first suffix terminating value and said second suffix value comprises one padding bit followed by a second suffix terminating value, said first suffix terminating value and said second suffix terminating value comprising respective ones of: NOT (TZ+2); and ($E_A$–$E_B$).

7. Floating point adder circuitry as claimed in claim 6, wherein said three padding bits and said one padding bit sum to a value corresponding to half of a unit of least precision in an output of said far-path adder.

8. Floating point adder circuitry as claimed in claim 1, wherein said second addend has a prefix of ($E_A$–$E_B$) zero values.

9. Floating point adder circuitry as claimed in claim 1, wherein said far-path circuitry has second addend shifter circuitry configured to operate in parallel with said trailing zeros counting circuitry, said second addend shifter circuitry logically right shifting MB by ($E_A$–$E_B$) bit positions.

10. Floating point adder circuitry as claimed in claim 9, wherein said second addend shifter circuitry provides leading zero values in a most significant ($E_A$–$E_B$) bit positions of said second addend value.

11. Floating point adder circuitry as claimed in claim 1, where said far-path circuitry has exponent difference calculating circuitry configured to operate in parallel with said trailing zeros counting circuitry, said exponent difference calculating circuitry calculating a value of ($E_A$–$E_B$).

12. Floating point adder circuitry as claimed in claim 1, wherein a bit length of $M_A$ is greater than or equal to $2^X$, where X is a positive integer, and a bit length of said first addend is less than $2^{(X+1)}$.

13. Floating point adder circuitry as claimed in claim 1, wherein a first input addend and a second input addend are received and comprising duplicate circuitry configured to form a first processing path that assumes said first input addend is greater than said second input addend and a second processing path that assumes said second input addend is greater than said first input addend and a multiplexer for selecting a result from one of said first processing path and said second processing path when it has been determined after addition processing has at least partially completed within said duplicate paths which of said first input addend and said second input addend is greater.

14. Floating point adder circuitry as claimed in claim 1, wherein a first input addend and a second input addend are received and comprising comparison circuitry configured to perform a comparison of said first input addend and said second input addend to determine which is greater and switching circuitry configured to switch paths of said first input addend and said second input addend to paths in dependence said comparison before addition of said first input addend and said second input addend is commenced.

15. Floating point adder circuitry as claimed in claim 1, wherein said far-path circuitry has inverting circuitry configured to invert bits within $M_B$ before said adder circuitry adds said first addend and said second addend such that said second floating point value is subtracted from said first floating point value.

16. Floating point addition circuitry as claimed in claim 1, said floating point adder circuitry comprising:
near-path circuitry configured to generate a result floating point value when said first floating point number and said second floating point number match at least one predetermined near-path condition, said near-path circuitry having:
a near-path adder configured to determine an interim mantissa value $M_I$ corresponding to ($M_A$–$M_B$);
leading zeros counting circuitry configured to determine a leading zeros value LZ corresponding to a runlength of leading zero values within $M_I$ starting from a most significant end of $M_I$; and
minimum value circuitry configured to determine result shift value as a lower of LZ and $E_A$; and
result shifting circuitry configured to left shift $M_I$ by a number of bit positions corresponding to said result shift value to generate a result mantissa $M_R$ forming part of a result floating point number.

17. Floating point adder circuitry as claimed in claim 16, wherein said near-path circuitry has mantissa shifting circuitry configured to perform, if $E_A$ does not equal $E_B$, a right shift of ($E_A$–$E_B$) bit positions upon $M_B$ before $M_B$ is input to said near-path adder.

18. Floating point adder circuitry as claimed in claim 16, wherein said minimum value circuitry is configured to generate one or more high order bits of said result shift value before one of more low order bits of said result shift value.

19. Floating point adder circuitry as claimed in claim 18, wherein said result shifting circuitry is a logarithmic shifter configured to right shift $M_I$ by a number of bit positions given by said result shift amount, said logarithmic shifting circuitry being configured to perform commence any left shift dependent upon said one or more high order bits before said one or more low order bit have been generated by said minimum value circuitry.

20. Floating point adder circuitry as claimed in claim 16, wherein said minimum value circuitry has two inputs P and Q corresponding to LZ and $E_A$ and determines said result shift value by determining a sequence of prefix portions P, of said result shift value of length $2^i$, starting from i=0, as
$P_i$=($LZ_i$ AND NOT $GR_i$) OR ($E_{Ai}$ AND $GR_i$), where
$LZ_i$ is a prefix portion of LZ of length $2^i$;
$E_{Ai}$ is a prefix portion of $E_A$ of length $2^i$;
for i=0 and each bit position k of descending significance, $EQ_i[k]$ is NOT(LZ[k] XOR $E_A[k]$);
for i=0 and each bit position k of descending significance, $GR_i[k]$=1 when LZ[k]>$E_A[k]$ and $GR_i[k]$=0 when LZ[k]≤$E_A[k]$;
for i>0 and each bit position k of descending significance, $EQ_i[k]$=$EQ_{i-1}[k]$ AND $EQ_{i-1}[k+2^{(i-1)}]$; and
for i>0 and each bit position k of descending significance, $GR_i[k]$=$GR_{i-1}[k]$ OR ($E_{i-1}[k]$ AND $GR_{i-1}[k+2^{(i-1)}]$).

21. Floating point adder circuitry as claimed in claim 16, wherein said near-path predetermined amount is 1.

22. Floating point adder circuitry as claimed in claim 16, wherein said minimum value circuitry constrains said result shift value such that said result floating point number is a valid denormal floating point number.

* * * * *